Jan. 10, 1939.  G. M. FISHER ET AL  2,143,190
METHOD OF RESOLVING EMULSIONS CONTAINING SOLIDS
Filed Oct. 15, 1935
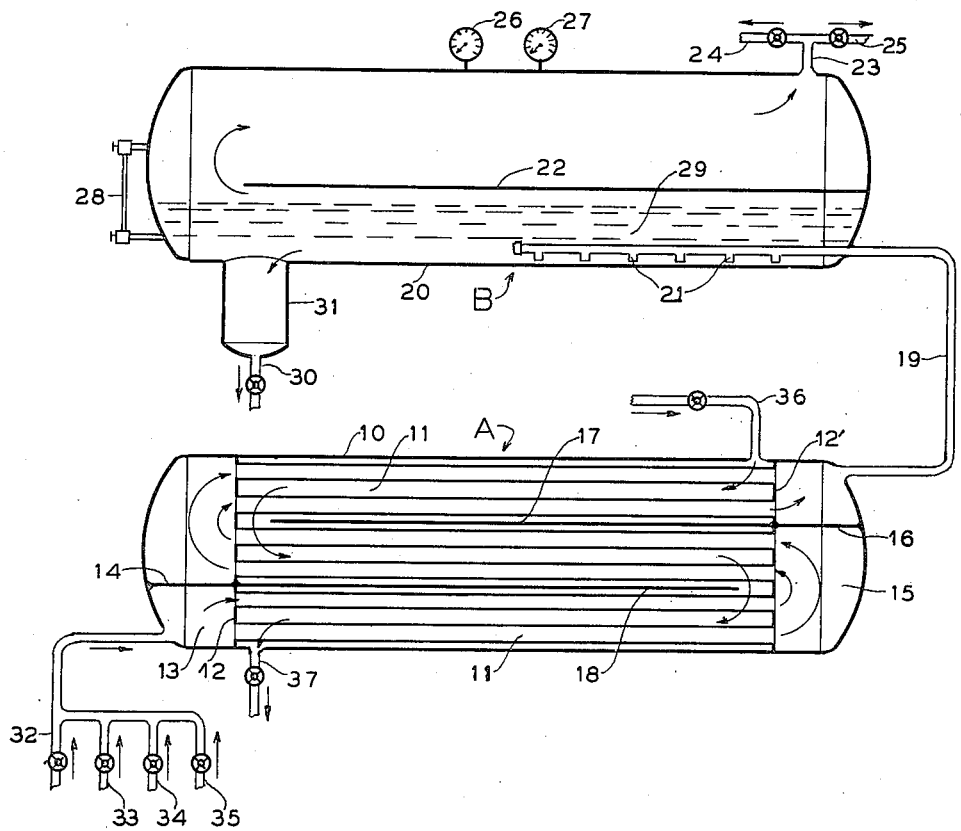
GERALD M. FISHER
MURRAY E. GARRISON
INVENTORS
ATTORNEY Patented Jan. 10, 1939

2,143,190

UNITED STATES PATENT OFFICE 2,143,190

METHOD OF RESOLVING EMULSIONS CONTAINING SOLIDS

Gerald M. Fisher, Los Angeles, and Murray E. Garrison, Huntington Park, Calif., assignors to Socony-Vacuum Oil Company, Incorporated, New York, N. Y., a corporation of New York Application October 15, 1935, Serial No. 45,114

4 Claims. (Cl. 196—4)

The object of our invention is to provide a rapid and economical method for resolving sump hole and tank bottom emulsions, and specifically petroleum emulsions containing material proportions of mud, asphaltic wax.

Most petroleum emulsions are more or less readily resolved and separated by well known methods such as washing with hot water, heating, treatment with chemical agents or passage through high tension electrical fields. It is known, however, that many of these treatments leave an unresolved residue and also that tankage in which crude petroleum is stored accumulates a bottom layer of sediment which contains a large proportion of petroleum but which does not respond readily, if at all, to any of the known treating methods.

These residues and tank bottoms are characterized by a rather coarse grain, i. e., a relatively large water particle size; by the presence of more or less and sometimes of a large proportion of mud, and often by the additional presence of a material proportion of wax which is solid at normal temperatures. This wax, when present, coats over the water particles to form an insulating barrier which prevents successful electrical treatment while the solids comprised in the mud constituent prevent the normal change in surface tension relations on which chemical treatment is based.

Proximate analyses of a considerable number of samples of sump hole and tank bottom emulsions accumulated in California show the following range of proportions of foreign matter, these constituents being listed in the order in which they stratify in a centrifuge tube:

Wax, from 0% to 5%.
Emulsion, from 5% to 30% or more.
Free water, from 5% to 50% more or less.
Sediment (mud), from 0% to 30% more or less.

We have discovered that by a combination of heating, chemical treatment and water washing under certain definitely limited conditions we are able to resolve and separate emulsion mixtures of the above character continuously and expeditiously and at a relatively low cost per barrel of oil recovered.

An apparatus which may be used to put our invention into practice is diagrammatically illustrated in the attached drawing, to which reference is made. In this drawing A generally designates a heating means and B a washing and separating means in which the resolution of the emulsion mixture is accomplished.

The heating element A may be any heating means but is here illustrated as a heat interchanger having a shell 10, tubes 11—11 and tube sheets 12—12. The emulsion mixture enters the tube chamber 13 beneath a baffle 14, flows through tubes to the opposite tube chamber 15, is returned by a baffle 16 to the first tube chamber above baffle 14, and is finally withdrawn from the second tube chamber above baffle 16. The heating fluid, which may be hot oil, steam under pressure, superheated steam, or any other hot medium is introduced through a pipe 36 into the space surrounding the tubes above a baffle 17 by which it is directed toward tube sheet 12, returns beneath baffle 17 and over a baffle 18 toward tube sheet 12', and is finally withdrawn from the shell through a pipe 37 at a point adjacent tube sheet 12 and below baffle 18. This showing is purely illustrative as the device is well known and no novelty is claimed.

The velocity of the wet oil fluid through the tubes in this type of heating element has a definite bearing on the efficiency of treatment and cost of operation of this unit. It has been observed that there is some critical velocity of the wet oil through the tubes, below which these tubes will gradually plug up from a deposition of the mud, salt and chemical materials contained in the wet oil. Above this critical velocity no deposition takes place and a safe value higher than a velocity of around 20 lineal feet per second is used to cover the variations in composition of the wet oil treated. The high velocity causes a highly turbulent flow so as to obtain a thorough mixture and contact of any constituents added to the wet oil. The cleaning of the tubes in the heating element after they have become plugged is a slow and costly operation as now found in common use.

The emulsion mixture which has been brought to the most desirable temperature in heating element A passes to the washing and separating element B through a pipe 19 which is continued for some distance within the settling shell 20. The portion of this pipe which is within the shell is provided with a number of downward looking outlets 21—21 which are arranged to distribute the emulsion feed over a portion of the length of the shell. The shell is provided with one or more baffles as indicated at 22, this baffle being so arranged as to cause the emulsion to flow toward the left hand end of the shell (as illustrated) and to return over the top of the baffle to a pipe 23 through which settled oil is withdrawn. This pipe may desirably be branched as at 24 and 25, one of these branches returning to the raw emulsion supply or being directed to some other vessel into which the system may be cleared in starting, while the other branch leads to a receiver for settled oil or to any other suitable point of disposition.

The settling shell should further be provided with instruments for reading temperature and pressure, as indicated at 26 and 27, and with a gauge glass or equivalent means for ascertaining the depth of a water body 29 which is maintained in the shell. A drain pipe 30 is provided for withdrawing mud from the shell and this may desirably be connected to the lower end of a mud drum 31 rather than to the shell proper.

The system is supplied with emulsion mixture and other materials through a main supply pipe 32 and, for reasons which will appear, this pipe should be provided with three branches. Thus, branch 33 may be used to introduce a relatively clean oil into the system, branch 34 is a water supply pipe and branch 35 may be used to supply a solution of caustic soda or other chemical, either acid or alkaline, which may be added to produce the proper treating alkalinity. It will be understood that each of these pipes is connected to a source of supply of the liquid which it is to convey and that each is provided with a pressure creating means by which the liquid may be introduced into the system against the pressure constantly maintained in it and which will be described. It will also be understood that the layout shown is purely an illustrative diagram and that no showing is made of the various automatic temperature and pressure controls, pumps and bypasses, meters and other devices which would enter into the construction of an operating system.

The method of our invention is strictly continuous and comprises the following steps: (a) heating the emulsion mixture to a temperature above the melting point of its wax content and to a temperature at which the petroleum contained in the mixture is brought to a fluent and mobile consistency; (b) passing the emulsion mixture in streams through a body of wash water maintained within certain limits of alkalinity; (c) moving the body of wash water into a zone of relative quiescence in which mud may settle and withdrawing mud and water of resolution of this zone in a stream; forming the washed emulsion into a body and moving this body into a zone of quiescence in which resolution is completed and from which water and sediment return to the water body; removing resolved and settled oil, and wax, if any, which has been dissolved in the oil, from the upper portion of the emulsion body; maintaining the entire system under such superatmospheric pressure as to prevent the ebullition of water or of any constituent of the petroleum contained in the emulsion.

In order to operate this process successfully it is necessary to observe certain limiting conditions as to temperature, pressure, velocity and alkalinity, which will now be described.

The temperature to which the emulsion mixture should be heated will not be less than 275° Fahr. and in the case of emulsions of heavy oils may be considerably higher. Our experience has indicated the following temperatures for emulsions of California petroleums: when the A. P. I. gravity is less than 20° the temperature should be 330° F. or above; gravity 20° to 25°, temperature 320° F.; gravity 25° to 30°, temperature 305° F.; gravity 30° to 35°, temperature 290° F.; gravity above 35°, temperature 275° F.

While 275° F. appears to be the approximate minimum temperature to which to heat California wet crude oils in order to obtain the proper fluidity of the oil and wax content thereof, this is not to be construed to mean the minimum temperature that may be found to yield the desired treatment. Many oils will be found to be free of any wax content, but will still be highly saturated with mud and chemicals which will treat very satisfactorily at lower temperatures. These oils due to their high mud and chemical content will still be unsuited to be economically treated by other dehydration methods now in use.

The pressure maintained on the entire system must be such as to maintain the contents of the system in the liquid phase and to prevent foaming of any component of the liquid phase. Ebullition of any volatile matter or of water will cause the contents of the settling vessel to re-emulsify, after which separation becomes very slow. The minimum pressure permissible will therefore be slightly above the boiling point of water at the maintained temperature in any case, while if the petroleum constituent of the emulsion contains any material proportion of gasoline it may be even higher.

The pressure generated by heating a sample of the emulsion to the selected temperature in a bomb filled to say three-quarters of its capacity and provided with a pressure gauge may readily be determined and a suitable operating pressure will be a few pounds above the test figure thus obtained.

A suitable pressure, corresponding to the temperatures shown, has been found to be from 140 to 160 pounds gauge pressure at which successful operation takes place for all California emulsified petroleum oils. Higher pressures could be used but without adding anything to the efficiency of treatment except to prevent foaming as heretofore described.

In order to maintain the settled mud in movement and permit its continuous withdrawal from the settling vessel it is necessary to provide sufficient water for a constant drawoff. In most cases there will be ample water in the emulsion mixture for this purpose, but where the mud content is very high or the water content is low it may be necessary to add water to the stream of emulsion entering the heater. As a rule it will be found desirable to maintain the water content of the entering emulsion stream at thirty percent or above, and where excessive amounts of mud are present (as in the bailing from freshly drilled wells) the water content may be materially higher. In any case the stream of mud continuously withdrawn through pipe 30 should be thin and fluent and the water content of the entering stream may be adjusted to maintain the mud stream in this condition.

In many cases the stream of settled oil discharged by the apparatus will be passed into the charging stream of a continuous still, and in such cases it is highly desirable to maintain this discharge stream at a substantially constant volume. This may be accomplished by adding sufficient clean or relatively clean oil to the entering emulsion stream to prevent the water content of the mixed stream from going over fifty percent. The addition of oil to emulsions of low oil content is also desirable as assisting in the resolution of the emulsion particles and as preventing the polymerization of the oil which might result from a very slow accretion of oil to the oil body and the resultant heating of this body over an extended period.

It is necessary to maintain the body of wash water in the settling unit in a state of alkalinity, and our experience has indicated that this alkalinity should not be less than pH 9.5 nor greater than pH 11. Caustic alkalies may be used to maintain this condition, and we use sodium hydroxide by reason of its lower cost. The alkali carbonates are seldom available as they usually disengage carbon dioxide which seriously interferes with settling. The alkali is brought into aqueous solution of any preferred strength and is introduced into the wash water, preferably by adding it to the stream of emulsion mixture entering the heater, as a carefully metered thin stream, through pipe 35. The wash water should be sampled at intervals of a few hours and the size of the alkali stream corrected if the alkalinity goes outside the above limits. It has been our experience that if the pH value of the wash water goes below 9.5, the entire contents of the washing and settling vessel are liable to become emulsified, while if the pH value goes above 11, the mud content of the emulsion is released very slowly and there is a tendency toward reversal of the phases of the emulsion which, if permitted, will bring the operation to an abrupt end.

The effectiveness of the washing operation, by which the salt water and mud are washed from the oil, will in a general way be proportional to the depth of the wash water body, and it is desirable to introduce the emulsion streams near the bottom of this body and to maintain the water-oil contact face close to but not in contact with the baffle 22—that is to say, when this baffle is laterally horizontal as illustrated. In other words, space must be left between the baffle and the upper surface of the water body for emulsion and oil to travel into the space above the baffle in which settlement takes place.

The velocity with which the emulsion mixture enters the body of wash water strongly affects the results obtained. If the velocity at which the emulsion passes through each of the jets 21 is less than about one-fourth lineal foot per second the washing operation will be incomplete and neither the mud nor the salts will be completely removed. On the other hand if the lineal velocity exceeds one foot per second there is a strong tendency toward reemulsification and the production of a resolved oil which cannot be completely settled.

We claim as our invention:

1. The method of continuously resolving a petroleum emulsion containing mud and solid wax which comprises: heating said emulsion to a temperature of liquefaction of said wax; passing said heated emulsion in upwardly moving streams through a body of hot water maintained under superatmospheric pressure, said water being rendered slightly alkaline by the addition of sodium hydroxide; maintaining said water body at a substantially constant volume; making periodic determinations of the alkalinity of said water; controlling said addition of sodium hydroxide to maintain said alkalinity substantially constant; slowly moving portions of said water body together with products of resolution of said emulsion out of the zone of emulsion introduction into a zone of substantial quiescence; and continuously withdrawing a stream of oil from the upper portion and a stream of aqueous mud from the lower portion of said quiescent zone.

2. A method substantially as and for the purpose set forth in claim 1 in which the alkalinity of the water body is maintained at a pH value between 9.5 and 11.0.

3. A method substantially as and for the purpose set forth in claim 1 in which the emulsion is introduced into said water body at a nozzle velocity ranging from one-fourth foot per second to one foot per second.

4. A method substantially as and for the purpose set forth in claim 1, including the additional step of introducing with said emulsion a sufficient quantity of one of the liquid constituents thereof to maintain the water:oil ratio of the feed stream within the range 30 water:70 oil to 50 water:50 oil.

GERALD M. FISHER.
MURRAY E. GARRISON.